US005774681A

United States Patent [19]
Kunishige

[11] Patent Number: 5,774,681
[45] Date of Patent: Jun. 30, 1998

[54] METHOD AND APPARATUS FOR CONTROLLING A RESPONSE TIMING OF A TARGET READY SIGNAL ON A PCI BRIDGE

[75] Inventor: Shinji Kunishige, Tokyo, Japan

[73] Assignee: Kabushiki Kaisha Toshiba, Kawasaki, Japan

[21] Appl. No.: 694,676

[22] Filed: Aug. 9, 1996

[30] Foreign Application Priority Data

Aug. 11, 1995 [JP] Japan .................................. 7-205683

[51] Int. Cl.⁶ ...................................................... G06F 9/46
[52] U.S. Cl. ........................... 395/308; 395/309; 395/281; 395/848; 395/842
[58] Field of Search ................................... 395/280, 281, 395/282, 842, 308, 309, 848, 287

[56] References Cited

U.S. PATENT DOCUMENTS 5,673,400  9/1997  Kenny .

OTHER PUBLICATIONS

Intel Corporation, "Mobile PC/PCI DMA Arbitration and Protrocols MHPG Architecture Functional Architecture Specification," Rev. 2.2, Apr. 22, 1996, pp. 2–27.

Intel Article, "Peripheral Components," pp. 3–33 through 3–50, (1993). PCI Local Bus Specification, PCI Special Interest Group, Revision 2.0 (1995).

PCI Local Bus Specification, PCI Special Intrest Group, Revision 2.1 (1995).

*Primary Examiner*—Jack B. Harvey
*Assistant Examiner*—Rupal D. Dharia
*Attorney, Agent, or Firm*—Finnegan, Henderson, Farabow, Garrett & Dunner, L.L.P.

[57] ABSTRACT

A PCI-ISA bridge device includes a PCI interface for driving a target ready signal line when PCI-ISA bridge device is address-specified as a current target by a read cycle on a PCI bus, and a status register for setting status information indicating respective states of a plurality of DMA request signals inputted to DMA controller. Further the PCI interface circuit includes a wait control circuit for inserting a predetermined wait time period in the timing for driving the target ready signal line, when the transaction is a read cycle for reading the content of the status register.

30 Claims, 9 Drawing Sheets

METHOD AND APPARATUS FOR CONTROLLING A RESPONSE TIMING OF A TARGET READY SIGNAL ON A PCI BRIDGE

FIELD OF THE INVENTION

This invention relates to a computer system, and in articular relates to a computer system which has a DMA controller implemented in a PCI bridge device.

BACKGROUND OF THE INVENTION

Standard system buses, such as ISA (Industry Standard Architecture) and EISA (Extended ISA) buses, are conventionally used in personal computers. Another standard bus, PCI (Peripheral Component Interconnect) bus, is commonly employed in desktop type personal computers to increase the speed of data transfer and to enhance the organization of the system architecture, independently of the kind of processors employed in the computers.

In a PCI bus, block transfer is the basis of substantially all data transfer. Transfer of each block is executed by burst transmission. For example, a maximum data transfer speed of 133 megabytes/sec. can be used on a data bus having a width of 32 bits. Therefore, when a PCI bus is used, data transfer between I/O devices and between a system memory and an I/O device is executed at high speed. As such, system performance is increased.

Recently, PCI busses are used not only in desktop type personal computers, but also in portable personal computers, such as notebook type computers. In desktop type personal computers, option cards for function expansion, such as PCI expansion cards and ISA expansion cards, are utilized by directly mounting them in an expansion slot on the system board. In such cases, a plurality of pairs of DMA request signal (DREQ) lines and DMA acknowledgment (DACK#) lines corresponding to a plurality of types of DMA channels are defined for each ISA expansion slot to which an ISA expansion card is connected. As a result, because each ISA expansion card uses a specific DMA channel (one combination of DREQ and DACK# lines) corresponding to that card, the DMA transfer function of a DMAC (direct memory access controller) core on the system board can be utilized. Thus, in a desktop type personal computer, devices which do not require a DMAC such as PCI bus masters, and devices which do require a DMAC such as ISA devices, can be relatively easily combined.

However, in portable personal computers, it is necessary to mount option cards, such as PCI expansion cards and ISA expansion cards, via an expansion unit known as a desk station. In such a case, it is necessary to reduce as much as possible the number of signal lines leading out from the portable personal computer to the desk station. This is because an increase in the number of signal lines leading out to the desk station requires a corresponding increase in the number of pins of the LSI mounted on the system board for interfacing with the desk station and an increase in the number of pins of the connector for connecting the portable personal computer and the desk station. This increases the cost of the portable personal computer and reduces the system mounting efficiency. As a result, the portable personal computer cannot have the plurality of pairs of DMA request signal (DREQ) lines and DMA acknowledgment (DACK#) lines leading out to the desk station. However, if the control lines for DMA transfer do not lead out to the desk station, option cards such as ISA cards cannot utilize DMA transfer.

Recently, a protocol for transmitting and receiving DMA request signals (DREQ) and DMA acknowledgment (DACK#) signals between an ISA expansion card installed in the desk station and a DMAC core on the system board of a portable personal computer, without using a plurality of pairs of DMA request signal (DREQ) lines and DMA acknowledgment (DACK#) lines, has been considered. This protocol uses a pair consisting of a bus access request signal (REQ#) and a bus access enable signal (GNT#) on the PCI bus for transfer of DREQ and DACK# of a plurality of channels. Under this protocol, DMA requests (DREQ) of a plurality of channels are transmitted to DMAC core connected to the PCI bus by means of serial transfer using DMA request signals (DREQ) and bus access request signals (REQ#). With regard to DACK#s, they are transferred from the DMAC core to the ISA expansion card of the desk station by serial transfer using the bus access enabling signal (GNT#). In the following discussion, the REQ# and GNT# used for the purpose of serial transfer of DREQ and DACK# are called serial REQ# and serial GNT#.

Where a DMA serial channel protocol that serializes and transfers a plurality of DMA channels in this way is utilized, only signal lines corresponding to the PCI bus lead out to the desk station. By simply providing a PCI-ISA bridge in the desk station, it is possible to use both PCI expansion cards and ISA expansion cards.

However, when utilizing such a structure the notification of DMA request signals (DREQ) requires processes for serializing DMA request signals (DREQ) of a plurality of channels at the PCI-ISA bridge within the desk station and for, in parallel, decomposing DREQ channel information notified by serial transfer at the DMAC core and providing the decomposed information to the DMAC. Therefore, a relatively long time period is required from generation of a DMA request signal (DREQ) from the ISA expansion card to reception of the DMA request signal by the This type of time lag of the DMA request signal (DREQ) in conventional systems causes misoperations. The conventional system will now be explained with reference to FIG. 1 and FIG. 2.

Figure 1:
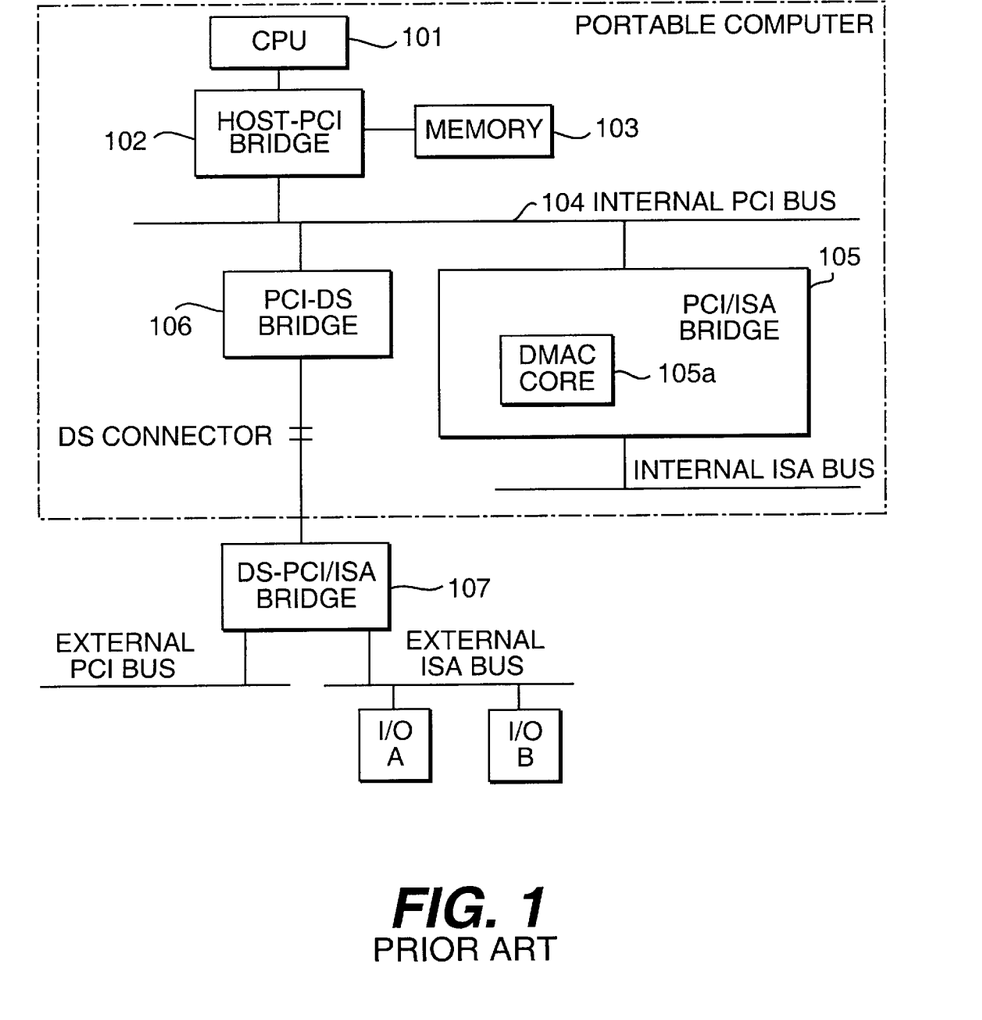
FIG. 1 is a system block diagram of a portable computer utilizing a DMA serial channel protocol.
Figure 2:
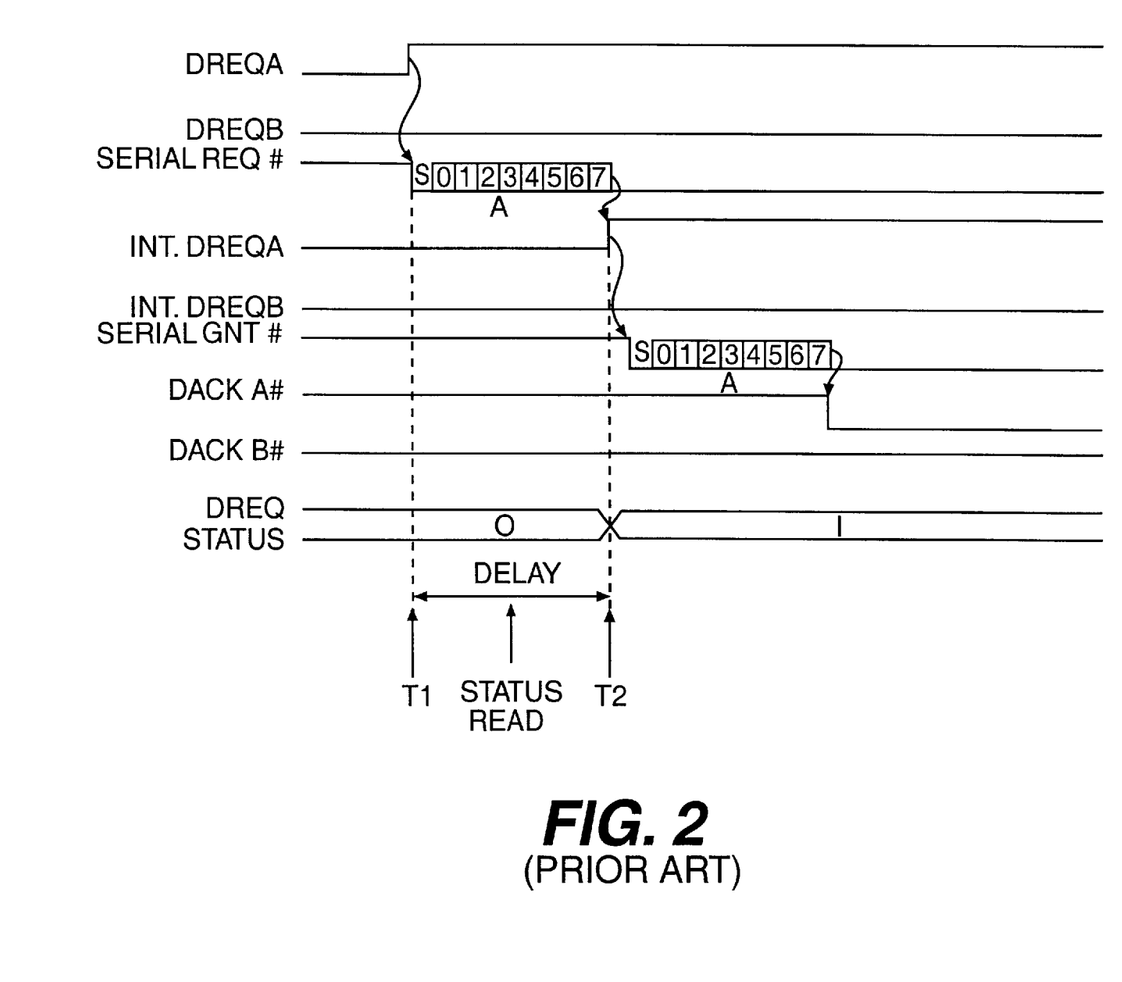
FIG. 2 is a timing chart to explain problems where a DMA serial channel protocol is utilized.

FIG. 1 illustrates a system block diagram of a portable computer and a desk station when utilizing DMA serial channel protocol, and FIG. 2 shows the sequence of a DMA serial channel protocol in the system.

As shown in FIG. 1, a Host-PCI bridge device 102 connects a CPU 101 to an internal PCI bus 104 within the portable computer. (A processor bus connects CPU 101 to Host-PCI bridge 102, which is connected to the internal PCI bus 104.) A system memory 103 is controlled by Host-PCI bridge device 102. Also, a PCI-ISA bridge 105 with a DMAC core 105a is connected to the internal PCI bus 104. Further, the internal PCI bus 104 is connected to a DS connector for connecting the computer main body and a desk station DS by means of a PCI-DS bridge device 106. A DS-PCI/ISA bridge device 107 is inside the desk station (DS). An external PCI bus and external ISA bus are connected to a DS-PCI/ISA bridge device 107 of the desk station.

In this system, transmission and reception of DREQ and DACK# between ISA expansion cards I/O A and I/O B on an external ISA bus and a DMAC core 105 on an internal PCI bus 104 are performed as shown in FIG. 2 according to the DMA serial channel protocol.

(1) CPU 101 executes an I/O write cycle with respect to the ISA expansion card I/O A, and issues an I/O command to the ISA expansion card I/O A. The ISA expansion card I/O A activates a DREQ A.

(2) DS-PCI/ISA bridge device 107 performs serial transfer utilizing a REQ#, and transmits a DREQ A from the ISA expansion card I/O A to the DMAC core 105a. In this case, a number of serial bit strings continuing on from a start bit S of the serial REQ# indicate that the DMA channel A has been rendered active.

(3) DMAC core 105a receives the serial REQ# and generates an internal DREQ A (Int. DREQ A) corresponding to the DMA channel (channel A) specified by the serial bit strings. The Int. DREQ A is supplied to one DREQ input port of a plurality of channels within the DMAC core 105a. As a result, DREQ status data indicating that a DREQ corresponding to the DMA channel (channel A) has been generated is set in a DMAC status register corresponding to channel A.

(4) DMAC core 105a performs serial transfer utilizing a GNT# and transmits a DACK A# corresponding to the DREQ A. In this case, the DMA channel A by which DMA transfer is to be executed is selected by the bit string following the start bit S of the serial GNT#.

(5) DS-PCI/ISA bridge device 107 receives the serial GNT# and generates a DACK A# corresponding to the DMA channel specified by the bit string. The commencement of DMA transfer utilizing the DMA channel A is notified to the ISA expansion card A by the DACK A#.

A delay thus occurs as a result of the DMA serial channel protocol between the timing T1 at which the DREQ A is generated by the I/O write cycle by CPU 101 and the timing T2 at which the DREQ status data of the DMAC status register is actually changed by the generation of the DREQ A.

CPU 101 executes the sequence of reading the DMAC status register after executing the I/O write cycle to the ISA expansion card A, to check whether the I/O write command set in the ISA expansion card A is correctly reflected in DMAC core 105a. If the read cycle to the DMA status register is executed in the period between the timings T1 and T2 before the DREQ status data is changed, CPU 101 mistakenly recognize that DMA transfer has finished. There is therefore a danger that commands subsequent to the DMA transfer process will be prematurely executed by CPU 101.

SUMMARY OF THE INVENTION

One object of this invention is to provide a computer system that prevents misoperations due to delays in bus control.

Another object of this invention is to prevent the CPU for mistakenly identifying the state of the DMA transfer, when a read cycle to a status register is initiated before a DREQ from an expansion device is reflected in the status register.

In accordance with the present invention, the foregoing objects, among others, are achieved by providing a computer system comprising a first agent device connected to a PCI bus, a arbiter means, connected to the PCI bus, for arbitrating bus access request signals from various I/O devices and for granting bus access enable signals to the I/O devices, according to the arbitration, a second agent device, connected to the PCI bus, for transmitting states of a plurality of DMA request signals outputted from each of I/O expansion devices to the arbiter means by utilizing a bus access request signal line allocated into the second agent device, a third agent device connected to the PCI bus comprising a status register for setting status information indicating respective states of a plurality of request signals, decode means for decoding a transaction executed on the PCI bus, and PCI interface means for, when the decode means decodes that the transaction on the PCI bus is a read cycle for reading the content of the status register, inserting a predetermined wait time period in the timing to respond to the read cycle.

There has also been provided, in accordance with yet another aspect of the present invention, a method of controlling a response time of a target ready signal, the method comprising the steps of executing a transaction on a PCI bus by a first agent device, arbitrating bus access request signals from various I/O devices and granting bus access enable signals to the I/O devices according to the arbitration by a arbiter means, transmitting states of a plurality of DMA request signals outputted from each of I/O expansion devices to the arbiter means by a second agent device, decoding a transaction executed on the PCI bus by a third agent device, and waiting a predetermined wait time period to respond to a read cycle by the third agent device, when the transaction on the PCI bus is a read cycle for reading the content of status register for holding status information indicating respective states of a plurality of request signals.

In the computer system of this invention, when the PCI-ISA bridge device is specified by an address as a current target by the read cycle on the PCI bus, a PCI interface means responds to the read cycle by driving a target ready signal line. This response timing is not always constant and the timing differs between the case of a read cycle to the status register and other cases. In the case of a read cycle with respect to the status register, the drive timing of the target ready signal line in consideration of a delay due to the DMA serial channel protocol is slower than other read cycles. Data transfer between the initiator which initiated the read cycle and PCI-ISA bridge 15 device is not executed until the target ready signal line is driven. As a result, even if the read cycle to the status register is initiated before the DREQ from the expansion device is reflected in the status register, the occurrence of the situation where CPU 11 mistakenly identifies the state of the DMA transfer can be prevented. Accordingly, DMA serial channel protocol with high reliability can be realized.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 3:
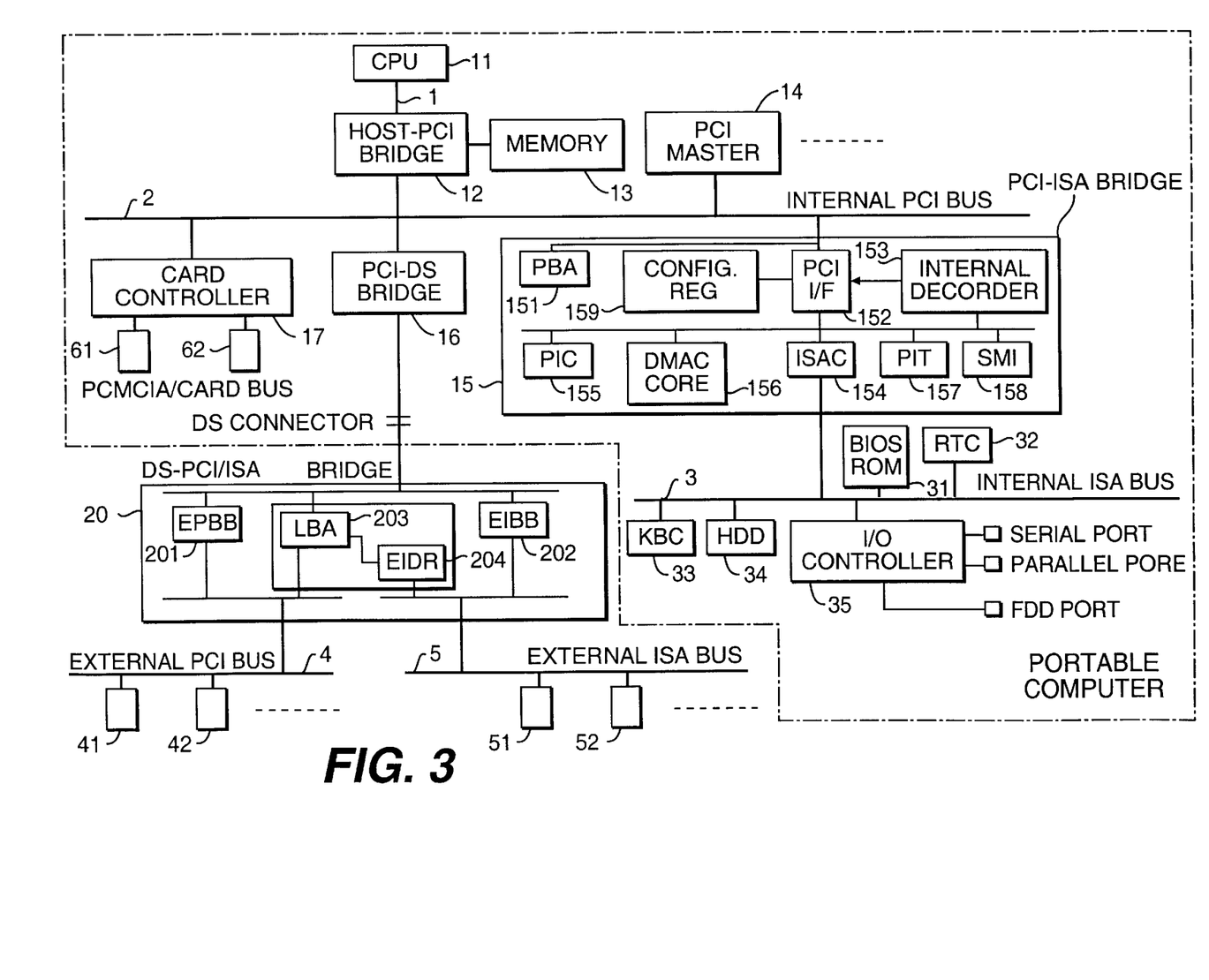
FIG. 3 is a system block diagram of a portable computer according to one embodiment of this invention.

FIG. 3 illustrates the structure of a computer system according to an embodiment of this invention. This computer system is preferably a notebook type or laptop type portable computer. Three types of buses, i.e., a processor bus 1, an internal PCI bus 2 and an internal ISA bus 3, are arranged on a system board of the computer. An external PCI bus 4 and an external ISA bus 5 are arranged in a desk station connected to a DS connector of the portable personal computer.

A CPU 11, a Host-PCI bridge device 12, a system memory 13, various types of PCI master devices 14, an internal PCI-ISA bridge device 15, a PCI-DS (DS: desk station) bridge device 16, a PC card controller 17 are provided on the system board of the computer. Also, a DS-PCI/ISA bridge device 20 is provided in the desk station.

CPU 11 is preferably a "Pentium" microprocessor produced and marketed by the Intel Company. Processor bus 1 is directly connected to input/output pins of CPU 11 and preferably has a 64-bit data bus.

System memory 13 is a memory device for storing an operating system, device drivers, application programs to be executed, processing data. System memory 13 is preferably formed by a plurality of DRAMs and is connected to a Host-PCI bridge device 12 via a memory bus having a 32-bit or 64-bit data bus. A processor bus 1 is utilized as data bus of the memory bus. In such a case, the memory bus is formed by an address bus and various types of memory control signal lines.

A HOST-PCI bridge device 12 is a bridge LSI for coupling a processor bus 1 and an internal PCI bus 2, and functions as one bus master of the PCI bus. The Host-PCI bridge device 12 has function of directionally converting bus cycles including data and addresses and function of controlling access of system memory 13 via the memory bus, between the processor bus 1 and the internal PCI bus 2.

The internal PCI bus 2 is a clock-synchronization type input/output bus. All cycles on an internal PCI bus 2 are performed in synchronism with a PCI bus clock. Frequency of the PCI bus clock is maximally 33 MHz. The PCI bus has an address/data bus used in a time division manner. This address/data bus has a width of 32 bits.

A data transfer cycle on the internal PCI bus 2 is formed from an address phase and one or more data phases following thereafter. An address and transfer type are output in the address phase. 8-bit, 16-bit, 24-bit or 32-bit data are output in the data phases.

A PCI master device 14 is one bus master of the PCI bus similarly to a HOST-PCI bridge device 12, and operates as an initiator or target. This PCI master device 14 is, for example, a graphics controller etc.

An internal PCI-ISA bridge device 15 is a bridge LSI circuit for coupling an internal PCI bus 2 and an internal ISA bus 3. A BIOS ROM 31, real time clock (RTC) 32, keyboard controller (KBC) 33, hard disk controller (HDD) 34, and I/O controller 35 are connected to the internal ISA bus 3.

A PCI bus arbiter (PBA) 151, PCI interface (PCI I/F) 152, internal decoder 153, ISA controller (ISAC) 154, interrupt controller (PIC) 155, DMAC core 156, system timer (PIT) 157, SMI generating logic 158 and configuration register group (CONFig. REG) 159 are implemented in the internal PCI-ISA bridge device 15.

PCI bus arbiter (PBA) 151 arbitrates bus accesses between all bus master devices connected to the internal PCI bus 2. In this arbitration, signal lines (a bus request signal REQ# line and a grant signal GNT# line) on an internal PCI bus 2 are allocated in one pair to each bus master device.

A bus request signal REQ# is a signal for notifying PCI bus arbiter (PBA) 151 of a request from a device corresponding therewith to use the internal PCI bus 2. A grant signal GNT# is a signal for notifying a device which issued a bus request signal REQ# that it has access use of the internal PCI bus 2.

Also, in this system, among the plurality of groups of REQ# and GNT# lines defined on the internal PCI bus 2, one REQ# and GNT# line group allocated to a DS-PCI/ISA bridge device 20 is used for a DMA serial channel protocol for transmission and reception of DREQs and DACK#s between DMA slaves connected to an external ISA bus 5.

All of the bus request signal REQ# lines and grant signal GNT# lines on the internal PCI bus 2 are connected to PCI bus arbiter (PBA) 151. Arbitration of bus access right is controlled by PCI bus arbiter (PBA) 151.

A PCI interface 152 performs transmission and reception of addresses, data, commands and various types of interface control signals with the internal PCI bus 2. The interface control signals also include a device select signal (DEVSEL#) and a target ready signal (TRDY#). The device select signal (DEVSEL#) is a signal for notifying the initiator which initiated the transaction that PCI-ISA bridge 15 has been selected as the target of a transaction executed on the internal PCI bus 2. The target ready signal (TRDY#) indicates that PCI-ISA bridge 15 has completed reading of the data if the transmission is a read cycle, and indicates that by PCI-ISA bridge 15 has completed writing of the data if the transmission is a write cycle.

Normally, the timing at which a PCI interface 152 responds to a bus cycle by driving the target ready signal (TRDY#) is constant. However, in this embodiment of the present invention, the delay due to the DMA serial channel protocol causes the drive timing of the target ready signal (TRDY#) line to be later in the case of a read cycle to the DMAC status register of DMAC core 156 than in other cases.

An internal decoder 153 performs address decoding for selecting each of the devices implemented in PCI-ISA bridge 15 (allocation controller 155, DMAC core 156, system timer 157, SMI generating logic 158 and configuration register group 159) and the devices on the internal ISA bus 3 (BIOS ROM 31, real time clock 32, keyboard controller 33, HDD 34, I/O port controller 35). The internal decoder 153 decodes I/O addresses, memory addresses and configuration addresses output to the internal PCI bus 2.

Also, the internal decoder 153 recognizes that a current bus cycle on an internal PCI bus 2 is a read cycle to the status register when the command type specified by a command/byte enable C/BE (3:0) is an I/O read cycle and an address A (31:0) specifies the status register of DMAC core 156. In this case, an internal decoder 153 notifies a PCI interface 152 that the current bus cycle is a read cycle of the status register to delay the drive timing of the target ready signal (TRDY#).

An ISA controller 154 executes an ISA bus cycle for access a memory and I/O on the internal ISA bus 3. The configuration register group 159 is a register group which is readable/writable during a configuration cycle, and a value which indicates a wait time period to delay the drive timing of the target ready signal (TRDY#) line is set therein when the power of the system is turned on.

Figure 4:
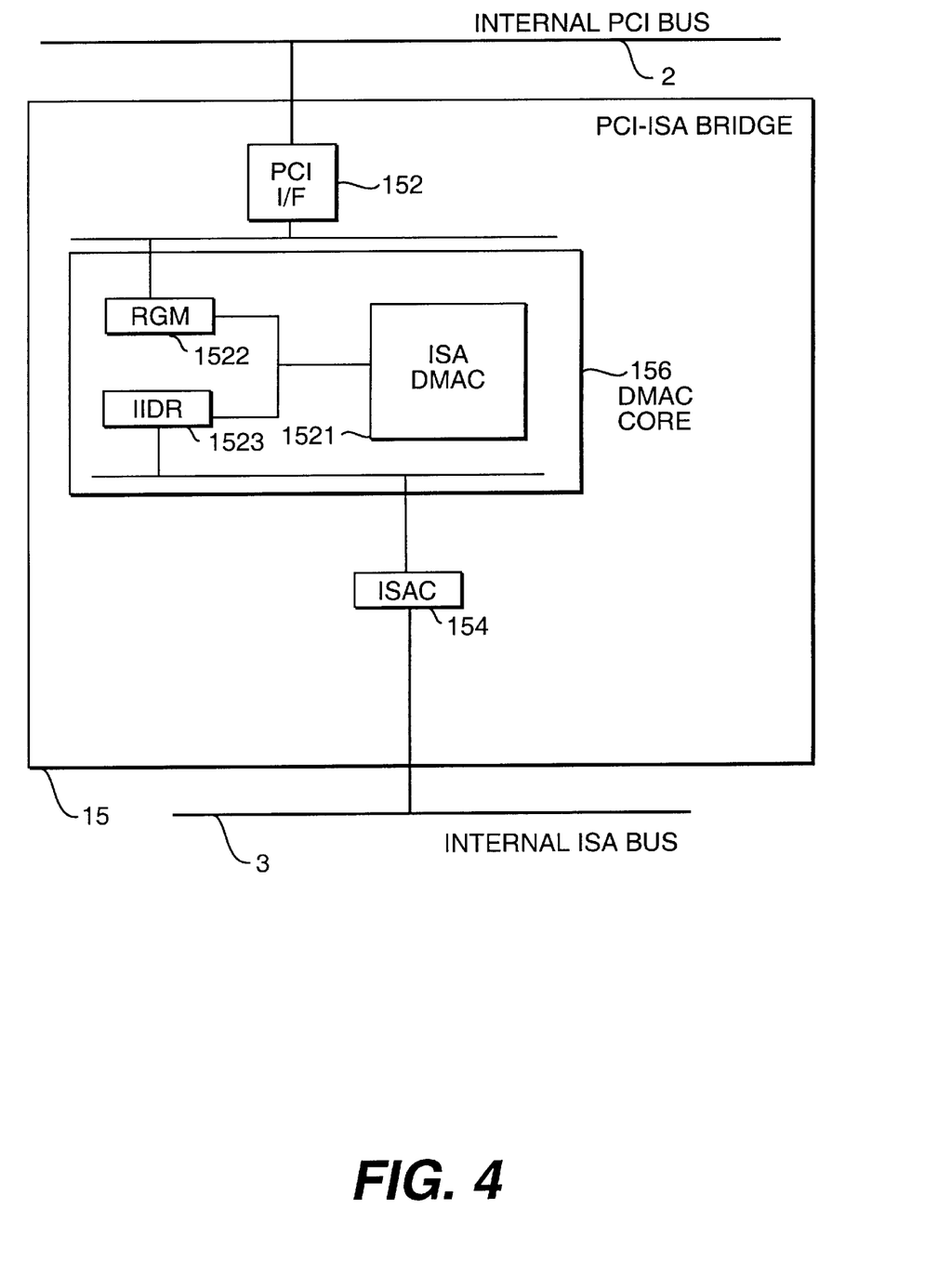
FIG. 4 is a block diagram of a DMAC core in a PCI-ISA bridge device of FIG. 3.

DMAC core 156 executes DMA transfer according to a request from an ISA device on the internal ISA bus 3 or an ISA expansion device on the external ISA bus 5. As shown in FIG. 4, DMAC core 156 is formed from the three blocks of an ISA DMAC 1521, a bus request and grant manager (RGM: REQ# and GNT# manager) 1522, and an internal ISA DMA router (IIDR) 1523. DMAC core 156 is an independent function block within the internal PCI-ISA bridge device 15.

Figure 5:
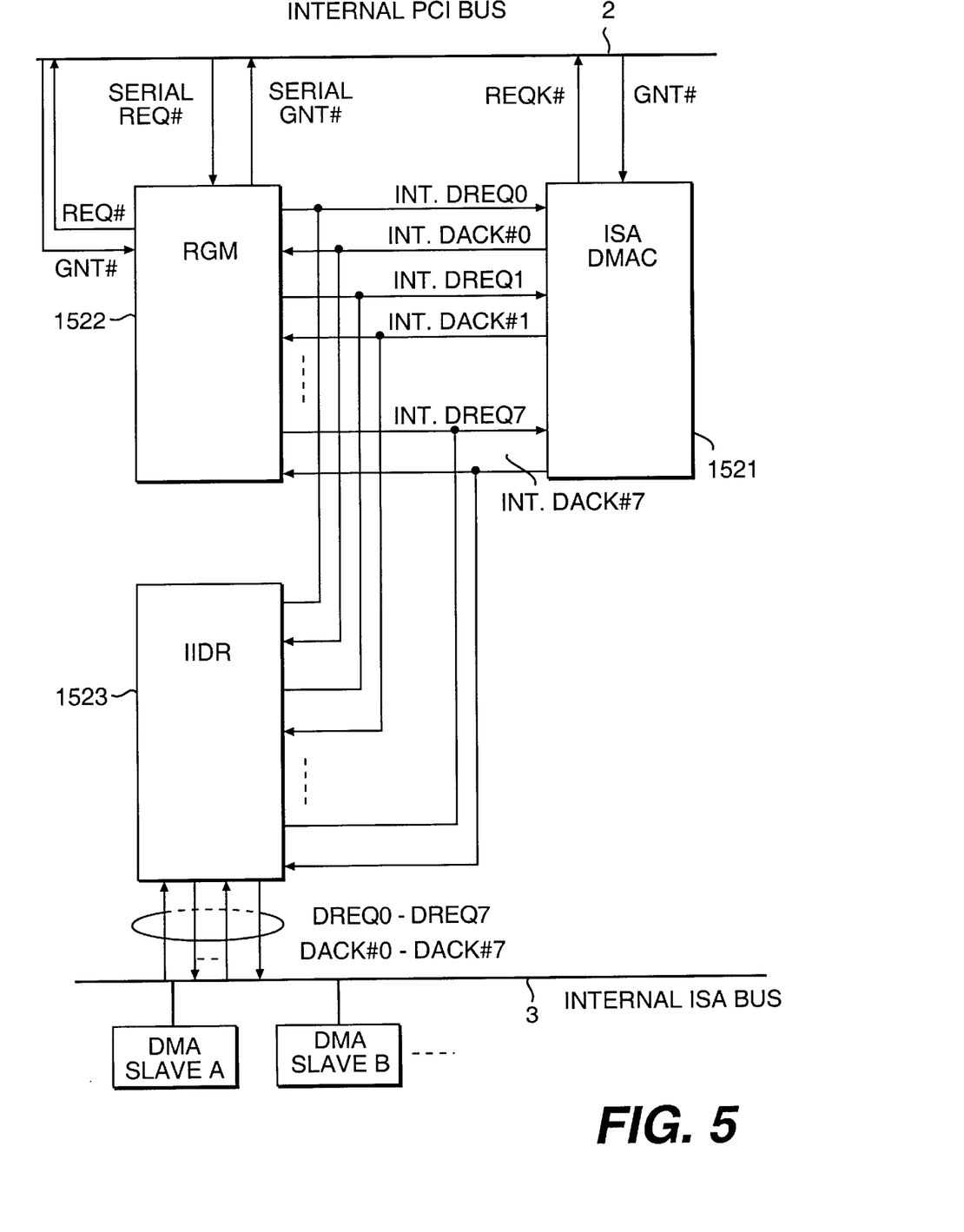
FIG. 5 is a block diagram showing the connection relationships within DMAC core of FIG. 4.

FIGS. 4 and 5 show the specific connection relationships of ISA DMAC 1521, request and grant manager (RGM) 1522 and internal ISA DMA router (IIDR) 1523. ISA DMAC 1521 is one bus master connected to the internal PCI bus 2, and executes DMA transfer, according to a request from a DMA slave device requiring DMA transfer. DMA slaves are logically connected to the internal PCI bus 2. Actually, cases where they are connected to the internal ISA bus 3 or the external ISA bus 5 through a bridge 15 or 20 are most common.

ISA DMAC 1521 has a DREQ input port where internal DREQs 0 to 7 are input and a DACK# output port for outputting internal DACK#s 0 to 7. Both the DREQ input ports and the DACK# output ports are connected to RGM 1522 and IIDR 1523. Transmission and reception of DREQs and DACK#s between DMA slaves 31, 32, . . . and ISA DMAC 1521 on an internal ISA bus 3 are executed via ISA controller 154 and IIDR 1523. Also, transmission and reception of DREQs and DACK#s between a ISA master 51 and DMA slave 52 on an external ISA bus 5 and ISA DMAC 1521 are performed by DMA serial channel protocol via RGM 1522.

Since ISA DMAC 1521 is connected to the internal PCI bus 2 via a PCI interface 152 and devices requesting DMA transfer are connected to the internal ISA bus 3 or the external ISA bus 5, in DMA transfer by ISA DMAC 1521, the read cycle (I/O read or memory read) and the write cycle (memory write or I/O write) are not generated simultaneously. Thus, first the read cycle is performed and the read data at that time are latched to a buffer register in ISA DMAC 1521. Next, the write cycle is executed and the previously latched data are output as write data on the internal PCI bus 2.

ISA DMAC 1521 generates both a read cycle and a write cycle on the internal PCI bus 2, irrespective of whether they are memory or I/O. Further, bridge device 15 or 20 converts a bus cycle on the internal PCI bus 2 to an ISA bus cycle. Namely, ISA DMAC 1521 generates both memory cycles and DMA exclusive I/O cycles on the internal PCI bus 2 and is not concerned with ISA bus cycles.

ISA DMAC 1521 preferably has one 82C37 compatible function which is the ISA bus system architecture standard, and supports DMA channels CH0 to CH7 by means of internal DREQs 0 to 7 and internal DACK#s 0 to 7. Among these channels, because DMA channel CH4 is used to cascade-connect two DMAC controllers, it is not used for DMA transfer. As a result, DREQ4 and DACK#4 among the internal DREQs 0 to 7 and internal DACK#s 0 to 7 are actually not connected to either RGM 1522 or IIDR 1523.

ISA DMAC 1521 performs arbitration of DMA channels by using the internal DREQs 0 to 7 and internal DACK#s 0 to 7 prepared in one pair each for every DMA channel. An internal DREQ is a DMA request signal used to notify ISA DMAC 1521 that a DMA slave is requesting execution of DMA transfer. A DACK# is a DMA acknowledgment signal by which ISA DMAC 1521 notifies commencement of DMA cycle execution a DMA slave which has requested DMA transfer. The DMA slave which is the subject of DMA transfer is selected by this DACK#.

Allocation of the DMA channels is exclusively performed between devices on the internal ISA bus 3 and devices on the external ISA bus 5. Each device transmits the DREQ corresponding to the DMA channel allocated thereto to ISA DMAC 1521 and receives the DACK# corresponding to the DMA channel allocated thereto from ISA DMAC 1521.

In this case, transmission and reception of the DREQ and DACK# between the external ISA bus 5 and ISA DMAC 1521, as described above, are performed according to the DMA serial channel protocol by using one group of serial REQ# and serial GNT# signal lines.

In this DMA serial channel protocol, the most recent DREQ state is transmitted from a DS-PCI/ISA bridge device 20 by a serial REQ#. This information is sent to RGM 1522. In RGM 1522, the serial REQ# is converted to internal DREQs 0 to 7 for ISA DMAC 1521.

Further, channel information of DMA transfer indicated by the internal DACK#s 0 to 7 output from ISA DMAC 1521 is sent to a DS-PCI/ISA bridge device 20 by a serial transfer by using the serial GNT# signal line through RGM 1522.

ISA DMAC 1521 preferably performs 82C37 compatible arbitration between DREQ channels, according to setting and adjustment of a DREQ channel mask, based on the most recent DREQ channel information provided from RGM 1522 and IIDR 1523. If there is an effective DMA request (DREQ), ISA DMAC 1521 first activates a REQ# allocated to itself and sends a request for bus access right to PCI bus arbiter (PBA) 151. ISA DMAC 1521 waits for a GNT# signal to be granted by PBA 151.

When the GNT# is provided from PBA 151 to ISA DMAC 1521, ISA DMAC 1521 activates an internal DACK# corresponding to a DMA channel number selected as a result of the arbitration. A DMA channel number at which DMA transfer was executed is returned to RGM 1522 and IIDR 1523. ISA DMAC 1521 executes a DMA cycle corresponding to a DMA transfer mode (single transfer mode, block transfer mode, demand transfer mode, and cascade mode) regulated by setup information of a selected DMA channel. In which case, ISA DMAC 1521 supports only bus cycles of the PCI bus for both memory and I/O cycles as described previously. The bus cycles in the ISA bus are emulated by a bridge device 15 or 20.

ISA DMAC 1521 provided status registers for each DMA channel therein. Each status register holds the DREQ status and TC (transfer conclusion) status of the corresponding DMA channel. DRQ status is the status of a new DREQ signal before passing through various types of mask prerequisites. TC status is set by TC notification, and is cleared by read out from the status register.

RGM 1522 serializes the plurality of DMA channels and manages the states of the serial REQ# and the serial GNT# in order to perform processes relating to the DMA serial channel protocol which is to transfer. RGM 1522 performs conversion between the DMA serial channel protocol and the DREQ/DACK# protocol of the ISA style regarding ISA DMAC 1521.

REQ# signals are input to RGM 1522. Also, the protocol of the REQ# is programmed for each REQ# signal. Consequently, if a number of pairs of REQ# and GNT# signal lines used as serial REQ#s and serial GNT#s are prepared, not only reception and transmission of DREQs and DACK#s between devices on an external ISA bus 5, which are performed through a DS-PCI/ISA bridge device 20, but also reception and transmission of DREQs and DACK#s between, for example, PC cards 61 and 62 of PC card controller 17 and ISA DMAC 1521 is performed by the DMA serial channel protocol.

RGM 1522 converts between DMA serial channel protocol and REQ#/GNT protocol for arbitration of the standard PCI style supported by PBA 151. This is described in "PCI Local Bus Specification," dated Jun. 1, 1995, written by PCI Special Interest Group, the content of which is hereby incorporated by reference.

In other words, not only reception and transmission of DREQs and DACK#s with devices on the external ISA bus 5, but also reception and transmission of REQs and GNT#s with the PCI master on the external PCI bus 4 are performed using the DMA serial channel protocol. In this case, RGM 1522 performs processing of the REQ#s and GNT#s in the following manner.

A PCI master such as LAN board, SCSI board on the external PCI bus 4, informs a DS-PCI/ISA bridge device 20 of a bus access request by activating the REQ#. A DS-PCI/ISA bridge device 20 informs RGM 1522 of the bus access request by serial data transfer by using the serial REQ#. In such a case, notification of the bus access request uses DREQ 4 which is the DMA channel not used by an ISA device.

RGM 1522 decomposes the serial REQ# signal and, upon detecting that the DREQ 4 has been notified by the serial REQ#, activates the REQ# and makes a request to PBA 151 for bus access. PBA 151 arbitrates upon the standard PCI rule and enables bus access for RGM 1522 by means of a GNT# signal.

RGM 1522, upon receiving the GNT# signal from PBA 151, notifies the DS-PCI/ISA bridge device 20 by means of serial transfer data using a serial GNT# that bus access was enabled. The DACK4 is used in this notification. A DS-PCI/ISA bridge device 20 decomposes the serial GNT# signal transmitted by RGM 1522 and supplies the GNT# to the PCI master on an external PCI bus 4. The PCI master commences a bus cycle upon receiving the GNT#.

Internal ISA DMA router (IIDR) 1523 changes a mapped DMA channel to the DMA slaves on the internal ISA bus 3, according to programmed mapping information. IIDR 1523 converts the states of DREQ signals from the DMA slaves to internal DREQs corresponding to the DMA channel numbers of these devices, according to mapping information, and sends them to ISA DMAC 1521. Further, IIDR 1523 converts internal DACK#s from ISA DMAC 1521 to DACK#s, which are actually used by the DMA slaves, according to mapping information, and outputs them to an internal ISA bus 3.

An internal ISA bus bridge (IIBB) (not shown) is a bridge LSI for connecting an internal PCI bus 2 and the internal ISA bus 3, and controls all devices on the internal ISA bus 3 such as memories, I/Os. The IIBB protocol-converts memory or I/O cycles generated on the internal PCI bus 2 for DMA transfer by ISA DMAC 1521, and sends them to the internal ISA bus 3.

A PCI-DS bridge device 16 is a bridge LSI for connecting the internal PCI bus 2 and a docking bus corresponding to an internal PCI bus 2 leading out to a desk station, and functions as an agent on the internal PCI bus 2. A buffer for synchronizing transfer of serial REQ#s/GNT#s by means of DMA serial channel protocol is implemented in this PCI-DS bridge device 16.

PC card controller 17 is one PCI bus master and controls PC cards 61 and 62 installed in the card slots connected to PCMCIA/Card bus and supports DMA serial channel protocol. When PC cards 61, 62 request DMA transfer, this DMA request, i.e. DREQ, is transferred to RGM 1522 by the serial transfer which uses the REQ# signal line allocated to PC card controller 17. Further, a DACK# from RGM 1522 is sent to PC card controller 17 by the serial transfer which uses the GNT# signal line allocated to PC card controller 17. PC card controller 17 decomposes this serial GNT# into a DACK# and passes it along to the PC cards 61, 62.

A DS-PCI/ISA bridge device 20 is a bridge LSI for connecting the docking bus (corresponding to the internal PCI bus 2), leading out to the desk station from the main body of the computer via the DS connector, to the external PCI bus 4 and the external ISA bus 5. A DS-PCI/ISA bridge device 20 is one PCI master similarly to PC card controller 17 and supports DMA serial channel protocol.

An external PCI bus bridge (EPBB) 201, an external ISA bus bridge (EIBB) 202, a local bus arbiter (LBA) 203 and an external ISA DMA router (EIDR) 204 are implemented in the DS-PCI/ISA bridge device 20.

EPBB 201 receives through the PCI-DS bridge device 16 memory cycles and I/O cycles generated by ISA DMAC 1521 on the internal PCI bus 2, and sends them to the external PCI bus 4. Further, where a bus access enable is granted to a PCI master device on the external PCI bus 4, EPBB 201 generates an external PCI bus transaction on the desk station.

Figure 6:
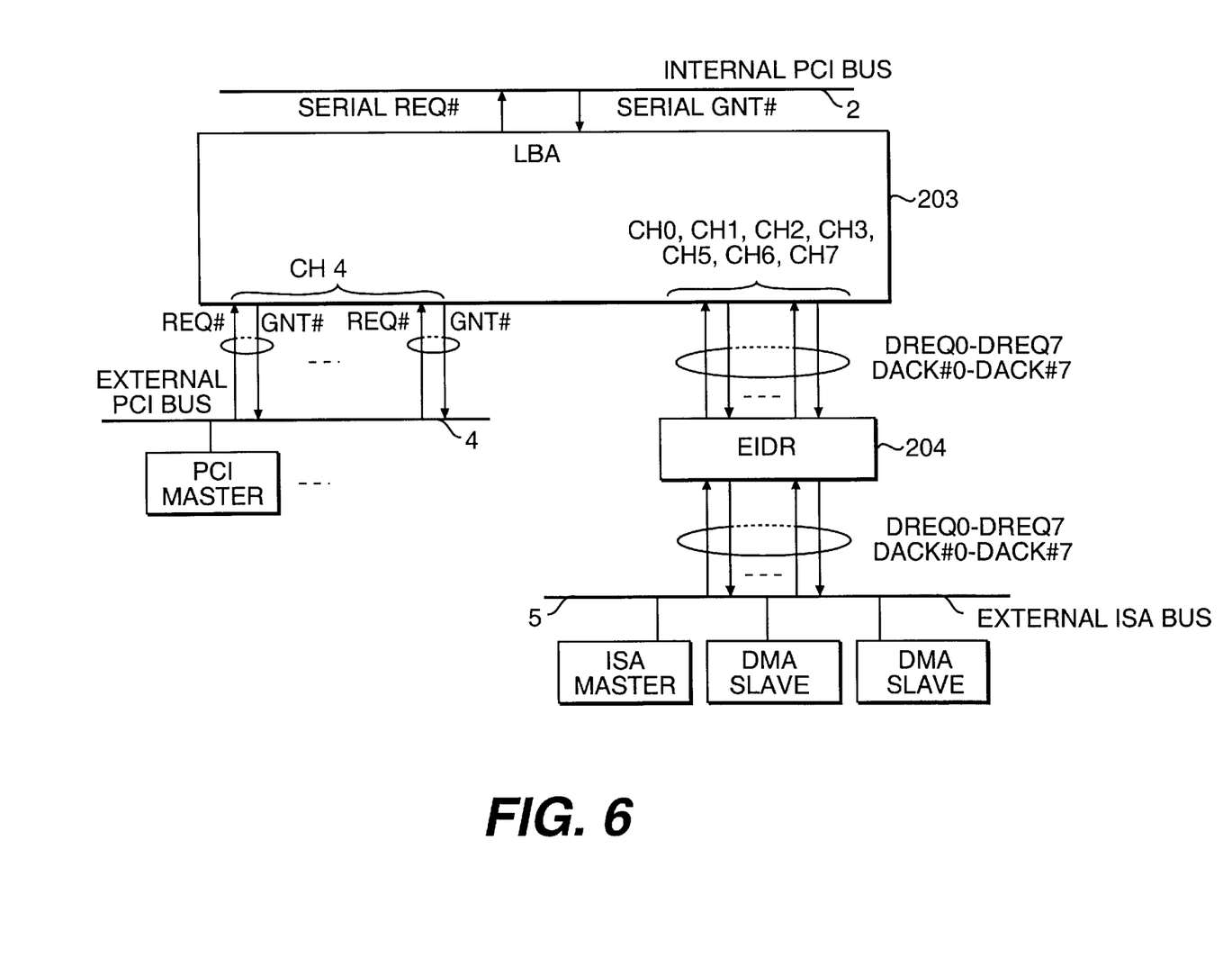
FIG. 6 is a block diagram showing a DS-PCI/ISA bridge device of FIG. 3.

EIBB 202 receives through a PCI-DS bridge device 16 memory cycles and I/O cycles generated by ISA DMAC 1521 on the internal PCI bus 2, protocol-converts them, and sends them to an external ISA bus 5. Further, where a bus access enable is granted to a ISA master device on the external ISA bus 5, EIBB 202 generates an external ISA bus transaction on the desk station. LBA 203 and EIDR 204 are provided to support DMA serial channel protocol, and FIG. 6 shows their connection relationships.

LBA 203 monitors changes in the states of bus access requests REQ# from a PCI bus master on the external PCI bus 4 and DREQ signals (basically of the amount of ISA DMA channels) from a ISA master on an external ISA bus 5 and DMA slaves, and sends the most recent state through a PCI-DS bridge device 16 by serial transfer of a but line using a serial REQ#. The format of the bit string transmitted by a serial REQ# is as follows.

```
              s  0  1  2  3  4  5  6  7
    REQ#      H, H, H, L, H, L, H, L, H, L, L, H, L, L, ...
```

LBA 203 takes the leading edge of the activated REQ# as the start bit (S) and sends the bits in series by using DMA channels 0 to 7 per each clock frame. The frame of channel 4 is used to send changes in the bus request state of a PCI master, while all other channels are used to send changes in the states of DMA requests of an ISA master and DMA slaves on the external ISA bus 5.

In each frame, "L" is taken to mean that there is no request and "H" is taken to mean that there is a request. In the above example, DREQs 0, 2 and 7 are active and correspond to a state where a PCI master on the external PCI bus 4 is requesting bus access (DREQ 4 is active).

LBA 203 has two operating states (proceed and freeze). Until LBA 203 receives a serial GNT# from RGM 1522, LBA 203 is in a proceed state and works to continuously send the most recent state to RGM 1522. In other words, in a proceed state, whenever a change in the state of a REQ# of a PCI bus master on an external PCI bus 4 or DREQs of an ISA master and DMA slaves on an external ISA bus 5 is generated, it is sent to RGM 1522 by DMA serial channel protocol.

When a serial GNT# is received from RGM 1522, LBA 203 decodes the bit string including the serial GNT# and either returns a DACK# to EIDR 204 or returns a GNT# on an external PCI bus 4. The format of the bit string transmitted by the serial GNT# from RGM 1522 is as follows.

```
              s 0 1 2
GNT#     H, H, H, L, H, L, L, L, . . .
```

RGM 1522 takes the leading edge of the activated GNT# as the start bit (S). Thereafter RGM 1522 allocates, one bit per one clock frame, in sequence from the least significant bit, information 3-bit coded from one of the DMA channel DACK#s 0 to 7, and sends it in series. The code of channel 4 is used to send a GNT# corresponding to a bus request state of the PCI master on an external PCI bus 4, while all other codes are used to send DACK#s corresponding to DMA requests of an ISA master and DMA slaves on an external ISA bus 5. In the above example means that DMA channel 1, which is channel code=1, was selected (DACK1# was supplied).

Upon receiving a GNT#, the operating state of LBA 203 is switched from a proceed state to a freeze state. The freeze state is maintained until the device (PCI master, ISA master or DMA slave) corresponding to the GNT# withdraws its bus access request. At which time, execution of serial REQ# cycles for reporting such operating states are frozen, even if changes in the states of other devices occur, and REQ#s continue to be maintained in active states.

In the DMA serial channel protocol of the present invention, the frame allocated by the use of a PCI master is channel 4 only, as a result of which in a case where a plurality of PCI masters exist on an external PCI bus 4, LBA 203 performs arbitration between REQ#s from the plurality of PCI masters.

EIDR 204 changes mapped DMA channels into an ISA master and DMA slaves on an external ISA bus 5, according to programmed mapping information. By the cooperation of EIDR 204 and IIDR 1523, DMA channels can be exclusively allocated to devices on an internal ISA bus 3 and devices on an external ISA bus 5.

EIDR 204 changes the state of DREQ signals from each of an ISA master and DMA slaves to DREQ signals corresponding to the DMA channel numbers of these devices, according to mapping information and sends them to LBA 203. Further, EIDR 204 changes DACK#s from LBA 203 into DACK#s actually used by an ISA master and DMA slaves, according to mapping information, and outputs them to an external ISA bus 5.

The flow of the DMA transfer process executed by ISA DMAC 1521.

(1) DRO Arrangement of ISA Interchange

ISA DMAC 1521 receives an ISA compatible DREQ signal from IIDR 1523 and RGM 1522. Based on this, it performs arbitration, and determines whether an effective (unmasked) DMA request exists and to which DMA channel the DACK# is to be returned.

(2) Generation of an Internal PCI Bus Access Request

If there is an effective DMA request, ISA DMAC 1521 generates a REQ# to PBA 151. However, at this time, the DMA channel for granting the DACK# is not determined. Further, when the internal PCI bus 2 is in a locked state in which generation of REQ#s is suppressed.

(3) Acquisition of an Internal PCI Bus Access Enable

ISA DMAC 1521, upon acquiring a GNT# from PBA 151, continues to output a bus access request REQ# until all necessary DMA transfer is completed. Normally, PCI bus cycles are generated a number of times. ISA DMAC 1521 does not disconnect the bus access on the way, even if the bus cycle finishes due to a target retry. At this time, once again the lock state of the internal PCI bus 2 is checked. If the internal PCI bus 2 is locked, the REQ# is rendered inactive and the GNT# is ineffective.

(4) Assertion of DACK#

ISA DMAC 1521, at the point where a GNT# is acquired, determines the DMA channel for granting the DACK#. The DACK# is returned to RGM 1522 and IIDR 1523. At the time when the DACK# is activated, the DMA channel is fixed.

(5) Generation and Repetition of Bus Cycles

ISA DMAC 1521 generates a bus cycle in the internal PCI bus 2 from when the DACK# is asserted. However, when the selected DMA channel has been programmed in cascade mode, a bus cycle is not generated.

The types of bus cycle are classified as the three types of write transfer, read transfer and verify transfer by the content (transfer type) of a mode register of the selected DMA channel.

Here, write transfer (I/O read-memory write) is specifically explained. The write transfer is executed by taking the following two bus cycles as one group and repeating them the necessary number of times.

DMA-exclusive I/O cycle (read)

memory write cycle

The DMA-exclusive I/O cycle (read) is exactly the same as the I/O read cycle of a standard PCI bus. However, the I/O address has a special meaning.

The I/O address is either one of:

00000000h: no TC

00000004h: TC exists

These addresses are allocated to 82C37 (DMAC), and no target other than ISA DMAC 1521 corresponds thereto. TC is a signal indicated the end of the transfer count value, i.e. transfer completion.

The agent, which is an I/O target, includes all bridges having paths that have received a DACK#. For example, when a DACK# has been granted to a DMA slave on the external ISA bus 5 by means of a serial GNT#, the agent includes PCI-DS bridge device 16 and EPBB 202 of the DS-PCI/ISA bridge device 20 that correspond to the granted DACK#.

The PCI-DS bridge 16 outputs a command (IOR#) on the external ISA bus 5. When the address specifies TC (00000004h), a TC is output to the external ISA bus 5. At this time, a DACK# has already been output by EIDR 204. Consequently, on the external ISA bus 5, read data is output from a DMA slave selected by the DACK#. The PCI-DS bridge 16 sends this data from the external ISA bus 5 to the internal PCI bus 2.

The read data is latched by ISA DMAC 1521. This data is used as write data in the memory write cycle generated by ISA DMAC 1521 immediately afterward. The memory write cycle generated by ISA DMAC 1521 is exactly the same as the memory write cycle of the standard PCI bus. A memory address is made from a current address register and a page register incorporated in ISA DMAC 1521. Write data latched by the DMA-exclusive I/O cycle (write) generated by ISA DMAC 1521 is used. In a single transfer, one byte (8 bit DMA) or two bytes (16 bit DMA) is/are generated. A HOST-PCI bridge device 12, which is one target, corresponds exactly to the same as the memory write from the standard PCI master, and write-accesses system memory 13. Even where finished due to a target retry, ISA DMAC 1521 regenerates the same memory cycle after placing it on standby for a short time. During this time, ISA DMAC 1521 does not release the internal PCI bus 2.

The response operation of PCI-ISA bridge 15 to the I/O cycle for reading the content of the DMAC status register will now be explained with reference to FIG. 7–FIG. 9.

Figure 7:
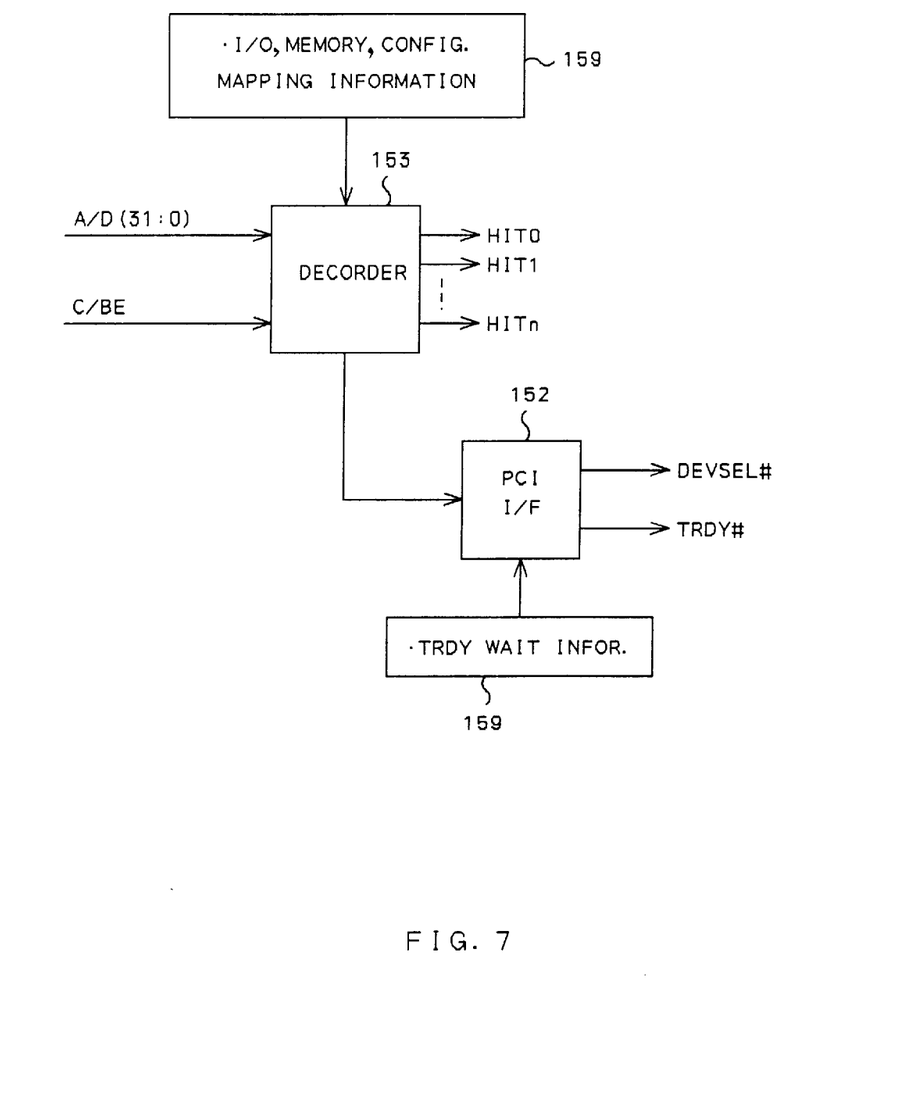
FIG. 7 is a block diagram showing the connection relationships of a decoder and PCI interface in a PCI-ISA bridge device of FIG. 3.

FIG. 7 shows the connection relationship of a PCI interface 152 and an internal decoder 153.

An internal decoder 153 decodes a command/byte enable C/BE (3:0) outputted in the internal PCI bus during the address phase period, and searches for the command type (I/O access, memory access, config. access) of the current transaction (bus cycle).

The relationship of the command/byte enable C/BE (3:0) and command types is as follows.

| C/BE (3:0) | Command Type |
|---|---|
| 0010 | I/O read |
| 0011 | I/O write |
| 0110 | memory read |
| 0111 | memory write |
| 1010 | configuration read |
| 1011 | configuration write |

An internal decoder 153 reads mapping information corresponding to the detected command type from the configuration register group, and selects a device which is the subject of access. For example, if the current bus cycle is an I/O read or I/O write cycle, an internal decoder 153 decodes the address AD (31:0) and generates one of the hit signals (HIT0 to HITn) for specifying the I/O(s) mapped within the I/O address range to which the value of the address AD belongs, according to the I/O mapping information and that decoding. Each bank hit signal outputted from an internal decoder 153 is used as a chip select signal or the like for selecting an I/O device disposed on the corresponding bank.

Also, an internal decoder 153 notifies a PCI interface 152 thereof, when the current bus cycle is an I/O read cycle to the DMAC status register.

A PCI interface 152 responds to the bus cycle by means of a DEVSEL# and a TRDY#, when a hit signal is generated from an internal decoder 153. Where it has been notified by an internal decoder 153 that the current bus cycle is an I/O read cycle to the DMAC status register, a PCI interface 152 delays the drive timing of a TRDY# only for a wait period specified by TRDY wait information set in one member of the configuration register group. Since the configuration register group is programmed by CPU 11, the value of the wait period can be set to be programmable.

Figure 8:
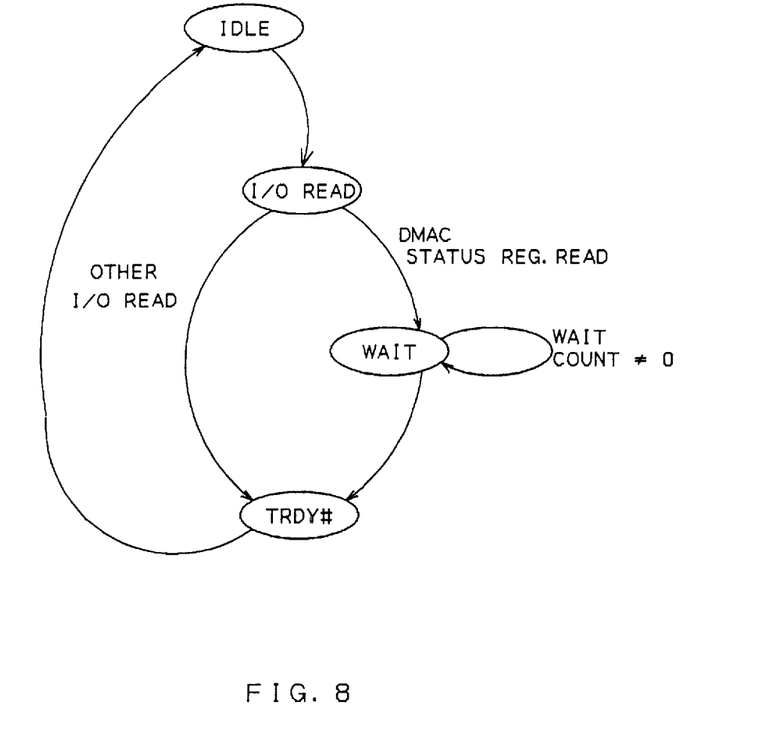
FIG. 8 is a state diagram illustrating operations of a PCI-ISA bridge device.

FIG. 8 shows a state diagram of a PCI-ISA bridge 15 where an I/O read cycle is performed on an internal PCI bus 2.

Where the I/O read cycle is executed on an internal PCI bus 2, PCI-ISA bridge 15 shifts from an idle state (IDLE state) to a state (I/O read state) for executing an I/O read. In the I/O read state, PCI-ISA bridge 15 determines whether the DMAC status register is accessed. If other than the DMA status register, PCI-ISA bridge 15 directly shifts to a state (TRDY state) for driving the TRDY#. If the DMA status register is the read subject, PCI-ISA bridge 15 shifts to a wait state and waits for only the wait period specified by the TRDY wait information.

Management of this wait period can be performed by using a down-counter (not shown) in a PCI interface 152. When the value of the down-counter reaches zero, PCI-ISA bridge 15 shifts to the state (TRDY state) for driving the TRDY#. In the TDRY state, a PCI interface 152 activates the TRDY# and notifies an initiator that read data has been prepared.

Figure 9:
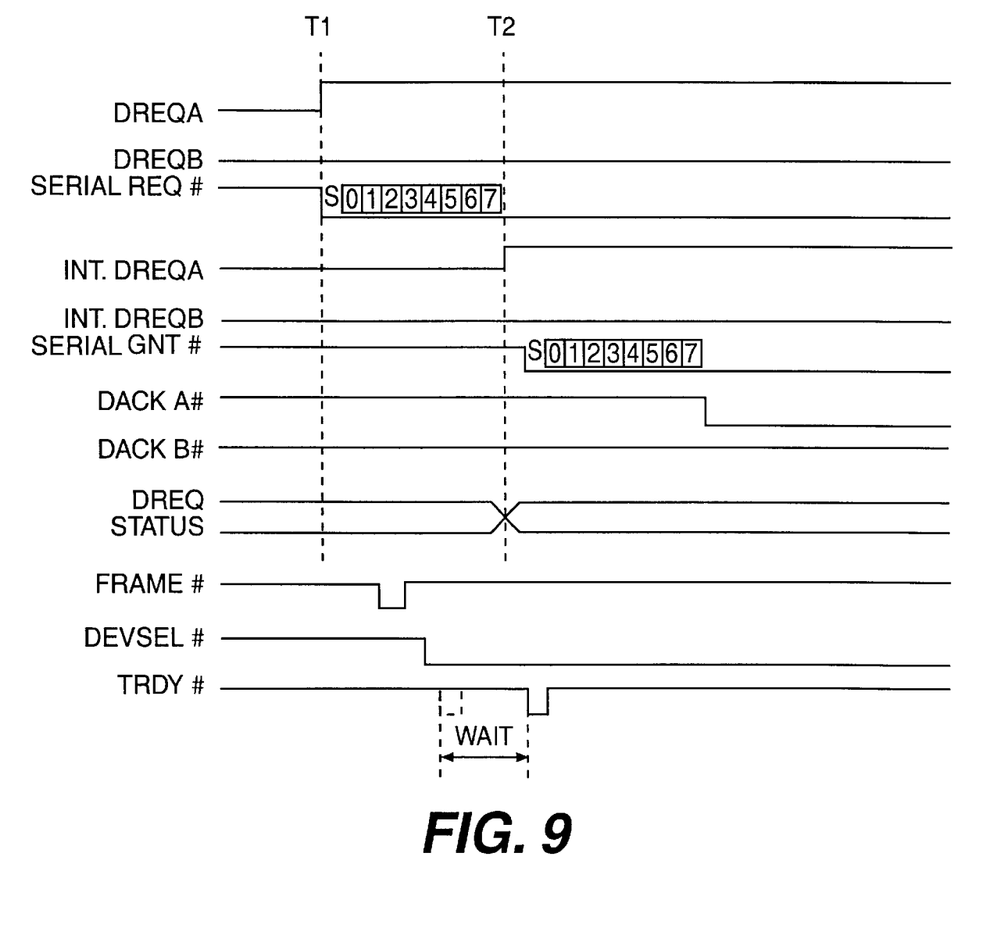
FIG. 9 is a timing chart showing operations to a status register read cycle executed by the PCI-ISA bridge device.

The timing chart of FIG. 9 shows the response operation of PCI-ISA bridge 15 to an I/O read cycle for reading the content of the DMAC status register executed by CPU 11.

(1) CPU 11 executes an I/O write cycle to an ISA expansion card A and generates an I/O command to the ISA expansion card A. The ISA expansion card A activates a DREQ A (timing T1).

(2) DS-PCI/ISA bridge 20 performs serial transfer utilizing a REQ#, and transmits the DREQ A from the ISA expansion card A to DMAC core 156. In this case, a number of serial bit strings following a start bit S of the serial REQ# indicate that the DMA channel A has been activated.

(3) DMAC core 156 receives the serial REQ# and generates an internal DREQ A (Int. DREQ A) corresponding to the DMA channel (channel A) specified by the serial bit strings. This Int. DREQ A is supplied to one DREQ input port of a plurality of channels within DMAC core 156. DREQ status data, which indicates that the DREQ corresponding to that DMA channel (channel A) has been generated, is then set in the DMA status register corresponding to channel A (timing T2).

(4) DMAC core 156 performs serial transfer utilizing a GNT# and transmits a DACK A# corresponding to the DREQ A. In this case, the DMA channel (channel A) by which DMA transfer is to be executed is selected by the bits strings following the start bit S of the serial GNT#.

(5) A DS-PCI/ISA bridge device 20 receives the serial GNT# and generates a DACK A# corresponding to the DMA channel specified by the bit strings. The commencement of DMA transfer utilizing the DMA channel A. is notified to the ISA expansion card A by the DACK A#.

Here, it is assumed that CPU 11, subsequent to the I/O write cycle of timing T1, commences an I/O read cycle for reading the DMA status register to check whether the I/O write command set in the ISA expansion card A is correctly reflected in DMAC core 156.

In this case, CPU 11 activates the frame signal FRAME# and initiates the I/O read cycle. In the address phase of the read cycle, the address and C/BE are outputted to the PCI bus. PCI-ISA bridge 15 firstly activates the DEVSEL# once PCI-ISA bridge 15 has been address-selected as the target by the address and C/BE. Then, the active timing of the TRDY# is determined according to whether the current bus cycle is a bus cycle for reading the content of the DMAC status register.

Namely, if the current bus cycle is other than a bus cycle for reading the content of the DMAC status register, the TRDY# is asserted directly after the DEVSEL# is made active as shown by the broken lines. If the content of the DMA status register is a bus cycle for reading, a predetermined wait period (e.g. four clocks or more) is inserted and thereafter the TRDY# is asserted.

As a result, even if a read cycle to the status register is commenced before at the time the DREQ A is reflected in the DMA status register (timing T2), the read transfer of the status data is actually executed after the timing T2. CPU 11 can thereby obtain correct status data.

The value of the wait period is determined according to the relationship of the time required for a DREQ A to be reflected in the DMA status register from when the DREQ A is generated by the I/O write cycle and the shortest time from when CPU 11 executes an I/O write cycle till commencement of the status data read cycle. Thus, CPU 11 can always obtain correct status data.

As explained above, in the embodiment of this invention, when PCI-ISA bridge 15 is address-specified as a current target by a read cycle on the PCI bus, a PCI interface 152 responds to that read cycle by driving the target ready TRDY# signal line. In such a case, the response timing is not always constant and the timing differs in a case where it is a read cycle to the DMA status register and in other cases.

Where it is a read cycle to the DMA status register, the drive timing of the target ready TRDY# signal line in consideration of a delay due to the DMA serial channel protocol is slower than other read cycles. Data transfer between an initiator which initiated a read cycle and PCI-ISA bridge 15 device is not executed until the target ready TRDY# signal line is driven. Thus, even if a read cycle to the status register is initiated before a DREQ from the expansion device is reflected in the status register, the occurrence of a situation where CPU 11 mistakenly identifies the state of the DMA transfer can be prevented. DMA serial channel protocol with high reliability can be realized.

I claim:

1. A computer system having a PCI bus, comprising:
   a first agent device connected to the PCI bus;
   an arbiter means, connected to the PCI bus, for arbitrating bus access request signals from various I/O devices and for granting bus access enable signals to the I/O devices, according to the arbitration;
   a second agent device, connected to the PCI bus, for transmitting states of a plurality of request signals outputted from each of I/O expansion devices to the arbiter means by utilizing a bus access request signal line of the second agent device; and
   a third agent device, connected to the PCI bus, including:
   a status register for setting status information indicating respective states of a plurality of request signals,
   decoder means for decoding a transaction executed on the PCI bus by the first agent device, and
   PCI interface means for, when the decode means determines that the transaction is a read cycle for reading the content of the status register, waiting a predetermined wait time period to respond to the read cycle.

2. The computer system of claim 1, wherein the PCI interface means includes means for, when the third agent device is address-specified by a read cycle executed on the PCI bus, driving a target ready signal on the PCI bus in responsive to the read cycle.

3. The computer system of claim 1, wherein the status register includes a configuration register.

4. The computer system of claim 3, the status register includes a programmable register.

5. The computer system of claim 1, wherein the decoder means includes means for decoding an address and a bus command on the PCI bus.

6. The computer system of claim 5, wherein the decoder means includes means for generating an I/O read cycle signal to the PCI interface means, when the transaction is a read cycle for reading content of the status register.

7. The computer system of claim 1, wherein the first agent device is a HOST-PCI bridge for connecting the PCI bus and a local bus connected to a CPU.

8. The computer system of claim 1, wherein the second agent device is a DS-PCI/ISA bridge for connecting the PCI bus to an external ISA bus.

9. The computer system of claim 8, wherein the third agent device includes a DMA controller core means, connected to a PCI interface means, for executing a direct memory access according to a request from an I/O expansion device on the external ISA bus.

10. The computer system of claim 9, wherein the second agent device is a PCI bus master for converting states of a plurality of request signals outputted from each of expansion I/O devices to serial information, and transmitting the serial information to the DMA controller core means by a serial transfer cycle utilizing the bus access request signal line allocated into the DS-PCI/ISA bridge.

11. The computer system of claim 10, wherein the third agent device includes serial/parallel conversion means for converting serial information transmitted by a serial transfer cycle utilizing the bus access request signal line to a plurality of request signals for inputting to the DMA controller core means.

12. The computer system of claim 11, wherein the status register includes status information indicating existence of states of request signals and transfer conclusion for each DMA channel of the DMA controller core means.

13. The computer system of claim 1, further comprising a programmable register for holding wait information for a wait time period for delaying a timing for driving a target ready signal line, so that a PCI interface means delays drive timing of the target ready signal line for only the wait information time period.

14. A method of controlling a response time of a target ready signal in a computer system having a bus connected to a status register that holds status information indicating respective states of a plurality of request signals, the method comprising the steps of:
   commencing a transaction on the bus;
   decoding the transaction; and
   waiting a predetermined wait time period to respond to a read cycle when the decoded transaction is a read cycle for reading a content of the status register.

15. The method of claim 14, further comprising the step of driving a target ready signal on the bus in response to the read cycle, when a first agent device of the computer system is address-specified by the read cycle performed on the bus.

16. The method of claim 14, wherein the decoding step includes the step of decoding an address and a bus command on the bus.

17. The method of claim 16, wherein the decoding step includes the step of generating an I/O read cycle signal to a bus interface means of the computer system for driving the target ready signal on the bus, when the transaction is a read cycle for reading the content of the status register.

18. The method of claim 14, further comprising the step of holding wait information for the wait time period for delaying a timing for driving the target ready signal line, so that a bus interface means delays drive timing of the target ready signal line for only the wait time period.

19. The method of claim 14, further comprising:
   transmitting states of a plurality of request signals outputted from each of I/O expansion devices connected to the computer system; and
   setting status information indicating respective states of a plurality of request signals into the status register.

20. Apparatus for controlling signals in a computer system having a bus:
   means for commencing a transaction on the bus;
   a status register connected to the bus for holding status information indicating respective states of a plurality of request signals;

means for decoding the transaction executed on the bus; and means for inserting a predetermined wait time period in a timing to respond to a read cycle when the transaction on the bus is a read cycle for reading a content of the status register.

21. Apparatus of claim 20, further comprising interface means for, when the transaction executed on the bus is a read cycle, driving a ready signal on the bus in response to the read cycle.

22. Apparatus of claim 21, wherein the decoding means includes means for decoding an address and a bus command on the bus, and means for generating an I/O read cycle signal to the interface means when the transaction is the read cycle for reading a content of the status register.

23. Apparatus of claim 20, wherein the status register includes status information indicating existence of states of DMA request signals and transfer conclusion for each DMA channel.

24. Apparatus of claim 21, further comprising a programmable register for holding wait information for a wait time period for delaying a timing for driving the ready signal, so that the interface means delays drive timing of the ready signal for only the wait time period.

25. A portable computer including a status register and a bus optionally connectable to an expansion unit, wherein a content of the status register indicates respective states of one or more signals, the portable computer comprising:

means for initiating performance of an activity on the bus;

means for determining whether the activity includes a request to read the content of the status register; and means, responsive to the determining means, for delaying performance of the activity on the bus for a predetermined period of time.

26. The portable computer of claim 25 further comprising means for performing the activity on the bus following the predetermined time period.

27. The portable computer of claim 26 wherein the delaying means includes means for generating a target ready signal following the perdetermined time period.

28. A portable computer including a status register and a bus optionally connectable to an expansion unit, wherein a content of the status register indicates respective states of one or more signals, the portable computer comprising:

means for initiating performance of an activity on the bus;

means for determining whether the activity includes a request to read the content of the status register; and means, responsive to the determining means, for performing the activity on the bus after the content of the status register has been updated.

29. The portable computer of claim 28 wherein the performing means includes means for reading the content of the status register after expiration of a predetermined wait period.

30. The portable computer of claim 28 wherein the performing means includes means for generating a target ready signal following a perdetermined time period.

* * * * *